June 15, 1965  W. A. DRAGER  3,188,656
APPARATUS FOR THE COLLECTION AND UTILIZATION OF WASTE WATER
Filed April 2, 1963
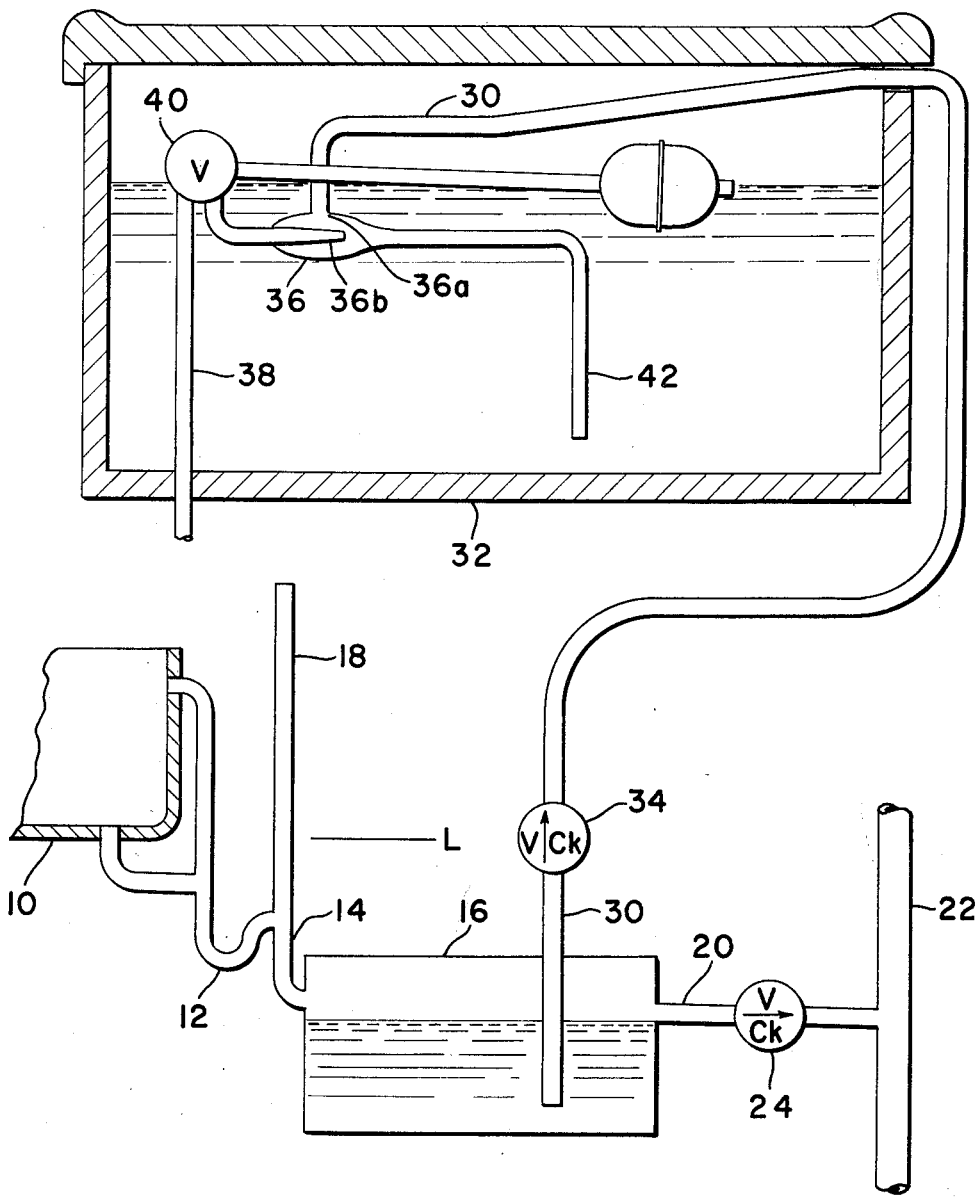
WAYNE A. DRAGER
INVENTOR.
BY Paul B. Fike
PATENT AGENT

United States Patent Office 3,188,656
Patented June 15, 1965

3,188,656
APPARATUS FOR THE COLLECTION AND
UTILIZATION OF WASTE WATER
Wayne A. Drager, P.O. Box 410, Ben Lomond, Calif.
Filed Apr. 2, 1963, Ser. No. 270,010
3 Claims. (Cl. 4—3)

The present invention relates generally to the conservation of water, and more particularly, to apparatus for the collection and utilization of waste water, such apparatus being readily adapted for residential, commercial and other application.

It is well known, particularly in certain sections of the United States, that the supply of water is marginal for the requisite purposes of residential and industrial users. Moreover, the severity of the problem constantly increases. In addition, many urban areas suffer from a somewhat related problem of sewage disposal in that the existent systems of disposal are inadequate to meet the demand. Present solutions to both the supply of water and the handling of sewage have entailed considerable expenditure and there exists obviously a practical limit on the available supply of water.

Accordingly, it is a general object of the present invention to provide a water conservation apparatus adapted for inexpensive incorporation in existing residential or industrial plumbing systems to reduce ultimately both the requisite supply of fresh water and the total volume of sewage.

More particularly, it is a feature of the invention to provide a water conservation apparatus that effects re-utilization of certain waste waters discharged from one or more places of initial utilization at other places of utilization to which such waste water is adapted for practical use.

Specifically in a residential environment, waste water discharged from bath tubs, automatic washers, and the like is utilized as the flush water for toilets, urinals, or the like, thereby providing in addition to conservation of water, a cleansing action of the secondary places of utilization.

Additionally, it is a feature of the invention to provide a water conservation apparatus incorporating a suction mechanism operative in response to the flow of fresh water to withdraw and re-utilize waste water from a storage tank or the like.

It is yet another significant feature of the invention to provide a water conservation apparatus that is readily adapted for simple, inexpensive application to existing residential or industrial plumbing systems.

These as well as additional objects and features of the invention will become more apparent from a persual of the following description of the apparatus diagrammatically depicted in the single figure shown in the accompanying drawing for explanatory purposes.

As illustrated, water which is drained from a bathtub 10 through an existent trap 12 and is delivered through a pipe 14 into the upper end of a storage tank 16, which for residential purposes can constitute a 40-gallon tank located immediately under the floor of the residence whose level is indicated at L. The conventional vent pipe 18 for the bathtub drain also serves as a vent for the storage tank 16.

An outlet pipe 20 is connected to the storage tank 16 at a level slightly below the described inlet pipe 14 and slopes therefrom to the main sewer pipe 22 of the residence. Preferably, a check valve 24 is located in the outlet pipe 20 to preclude the re-entry of sewage water into the described storage tank 16.

A third pipe 30 terminates at its lower end approximately two inches above the bottom of the storage tank 16 and leads therefrom to a secondary place of water utilization which is here indicated diagrammatically as the flush tank 32 of a conventional toilet. This pipe 30 includes a check valve 34 permitting flow of water only from the storage tank 16 upwardly into the flush tank 32. Within the flush tank 32, the pipe 30 from the storage tank 16 terminates in the outer annular portion 36a of a Venturi device 36 of known design. The central pipe section 36b of the Venturi device is connected to the existent fresh water supply conduit 38 through the conventional float-control valve 40. When the valve 40 is opened as the float drops to a low level, fresh water flows through the valve 40 and into the central section 36b of the Venturi device whereupon a suction is created in the annular portion 36a of the Venturi to draw waste water from the storage tank 16. The fresh water and the waste water so withdrawn are discharged through an outlet pipe 42 connected to the Venturi device to replenish the depleted water supply in the flush tank 32. Obviously, when the float reaches a predetermined level, the fresh water valve 40 is closed and the flow of fresh water ceases. With such cessation of the fresh water flow, no further suction is created in the Venturi device 36 and the flow of waste water into the annular portion 36a thereof also stops. However, because of the check valve 34 in the supply pipe 30 extending from the storage tank, the waste water is maintained in such pipe rather than being drained back into the storage tank 16.

In a practical application, the normal flush tank 32 discharges twenty-three quarts of water per flushing operation, and with the described arrangement, thirteen quarts will be supplied from the source of fresh water and ten quarts of the waste water will be drawn from the storage tank 16. Thus, somewhat less than a fifty percent reduction in the fresh water requirements for toilet operation is obtained. The supply of waste water in a normal residence will be adequately derived from the draining of a bathtub, but if an additional supply is requisite, appropriate connections to showers, automatic washers or the like can be utilized in a similar fashion. Furthermore, even in the event that the storage tank 16 be empty, no interference with the operation of the toilet will be experienced since the fresh water will merely flow until the float rises sufficiently to close the fresh water valve 40.

It is to be observed that the described installation only involves the addition of a storage tank, one additional flow conduit and a Venturi device to the existent plumbing installation. With normal residential water pressures, the storage tank can be located fifteen feet or more below the flush tank or other place of utilization; wherefore no expensive pump is required for the installation.

As has been indicated hereinabove, the waste water can be supplied from bathtubs, showers, automatic washers, and other places of utilization and can be reused in flush tanks or other secondary places of utilization adapted for such use. The waste water from the indicated sources usually contains a certain amount of soap or detergent and thus has the additional advantageous function of cleansing the flush tank and the toilet into which such waste water is ultimately discharged.

A large number of additional sources of waste water can be visualized as well as other places of application of such waste water to effect conservation of fresh water, and the specific arrangement of the water conservation apparatus as described hereinabove is also subject to modification and/or alteration without departing from the spirit of the invention. Accordingly, the described arrangement is to be considered purely as exemplary and not in a limiting sense, and the actual scope of this invention is to be indicated only by reference to the appended claims.

What is claimed is:

1. Apparatus for utilization of waste water which comprises a primary water utilization unit from which waste water is discharged, a secondary water utilization unit, means for delivering fresh water to said secondary water utilization unit, and means for delivering waste water discharged from said primary water utilization unit to said secondary water utilization unit, said waste water delivering means being operative in response to delivery of fresh water to said secondary water utilization unit.

2. Apparatus for utilization of waste water which comprises a primary water utilization unit from which waste water is discharged, a storage tank connected to said primary water utilization unit and arranged to receive the waste water discharged therefrom, a secondary water utilization unit including a supply tank, means for delivering fresh water to said supply tank including a fresh water supply conduit, a venturi device in said fresh water supply conduit, and a waste water supply conduit connected between said storage tank and said venturi device whereby a flow of fresh water draws waste water from said storage tank and delivers mixed waste water and fresh water to said supply tank.

3. Apparatus for utilization of waste water according to claim 2 which comprises a check valve in said waste water supply conduit permitting flow of water only towards said venturi device.

References Cited by the Examiner

UNITED STATES PATENTS

| | | | |
|---|---|---|---|
| 1,303,358 | 5/19 | Montgomery | 4—115 |
| 1,963,522 | 6/34 | Gavaza | 103—262 |
| 2,921,319 | 1/60 | Kivela | 4—10 |
| 2,993,214 | 7/61 | Franco | 4—228 |
| 3,001,210 | 9/61 | Diehl | 4—225 |

LEWIS J. LENNY, *Primary Examiner.*

EDWARD V. BENHAM, *Examiner.*